Dec. 21, 1937. T. A. BOWERS 2,103,142
COMPACTING APPARATUS
Filed Jan. 4, 1936 7 Sheets-Sheet 1
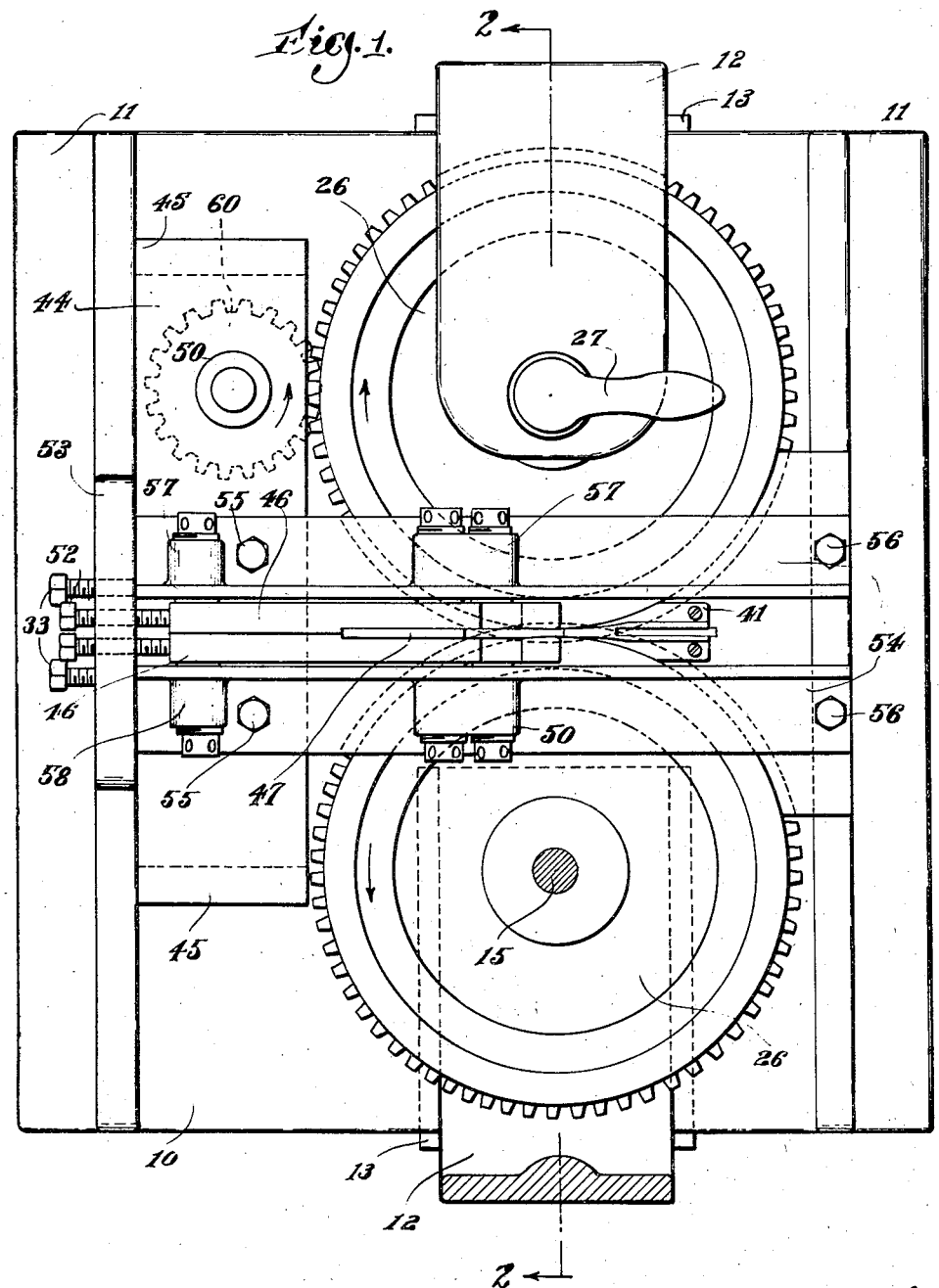

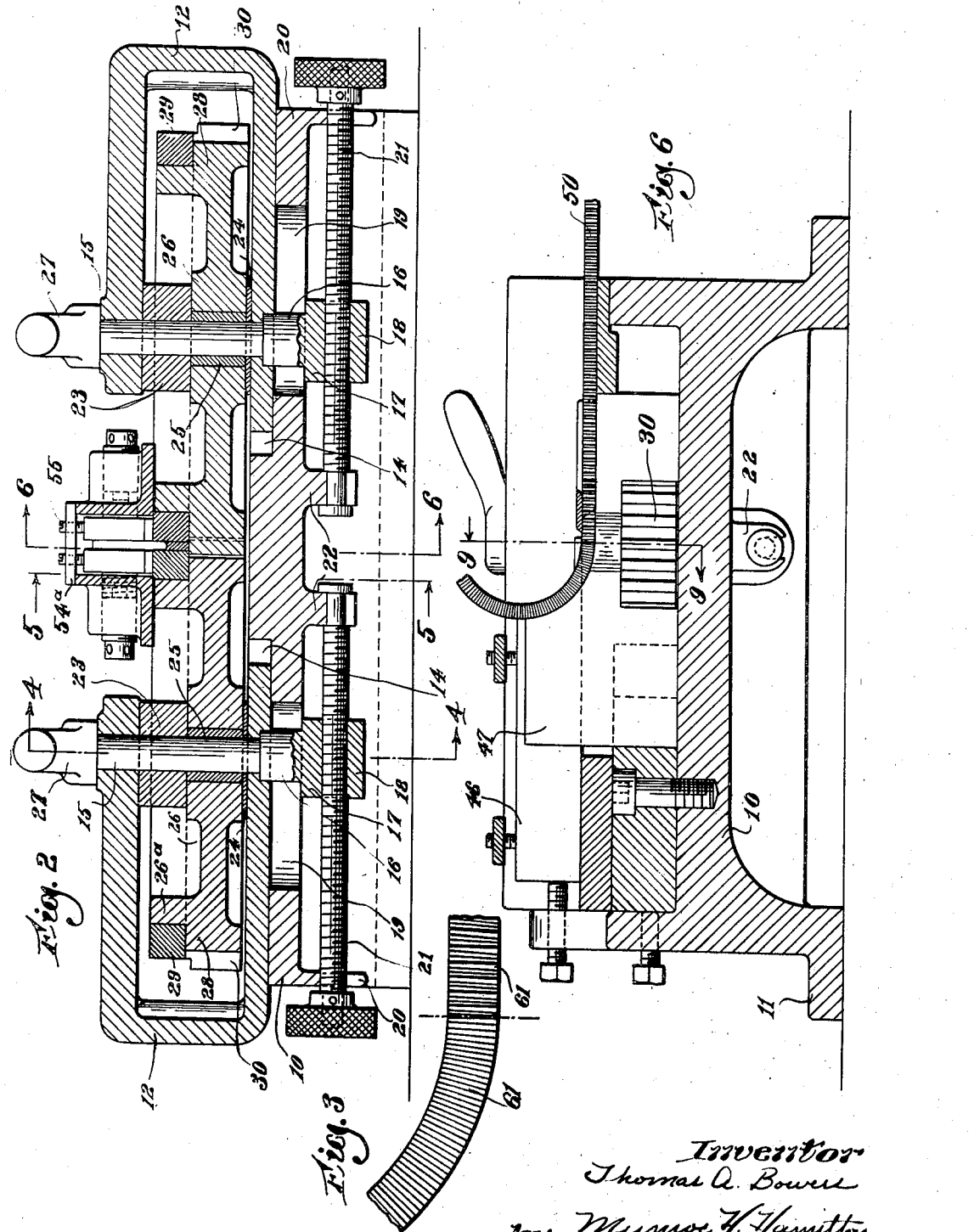

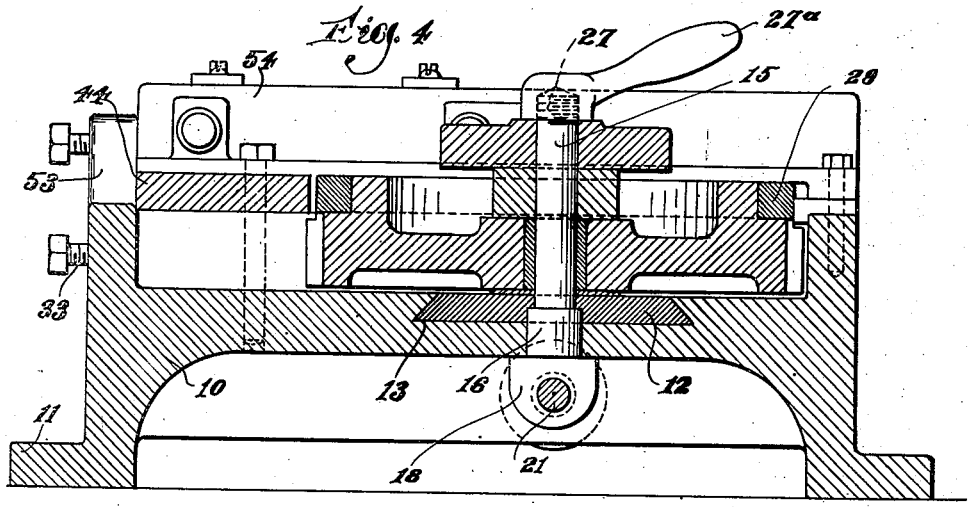
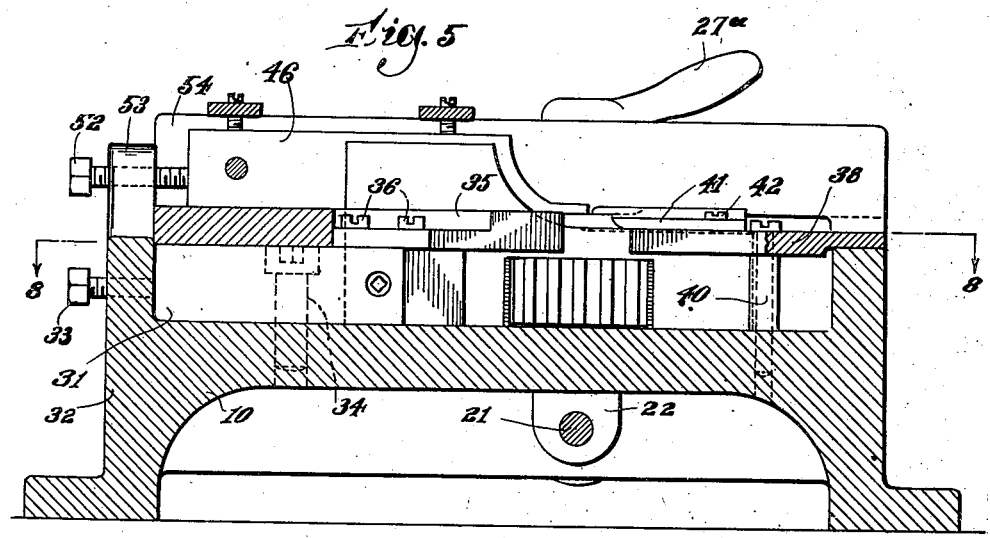
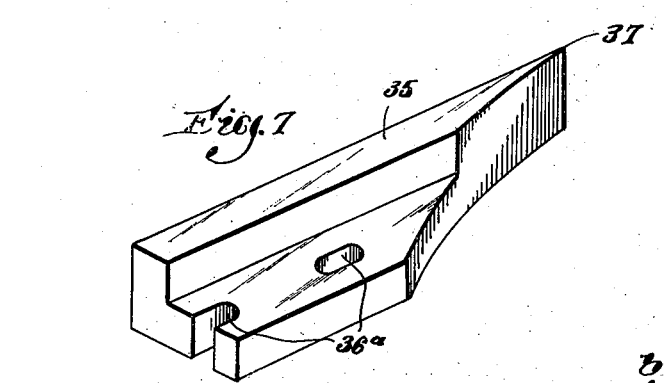

Dec. 21, 1937. T. A. BOWERS 2,103,142
COMPACTING APPARATUS
Filed Jan. 4, 1936 7 Sheets-Sheet 4
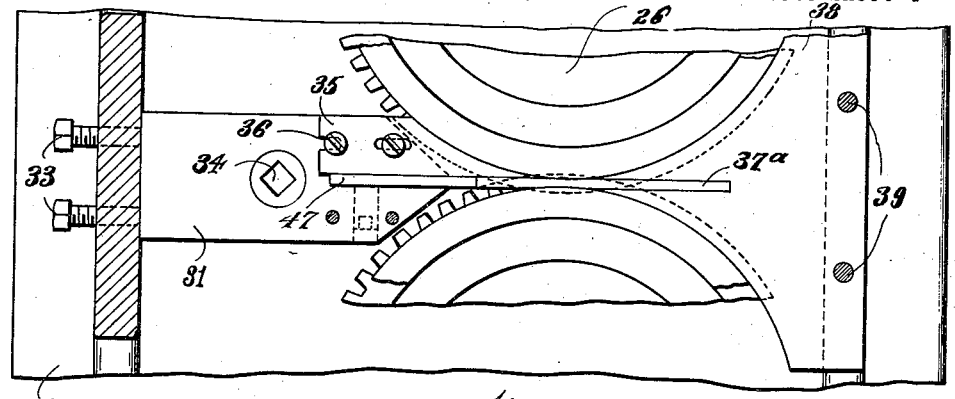
Fig. 8
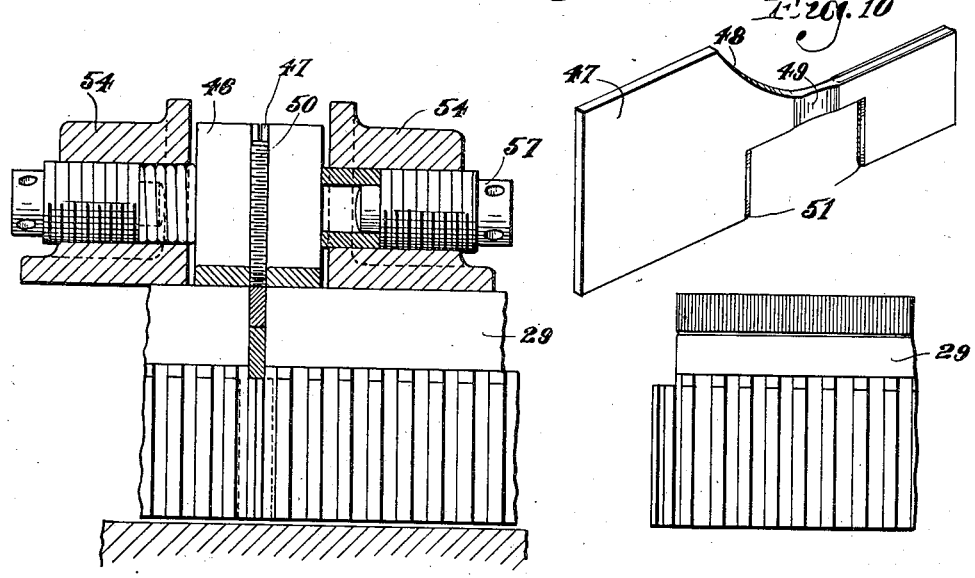
Fig. 9
Fig. 10
Fig. 12
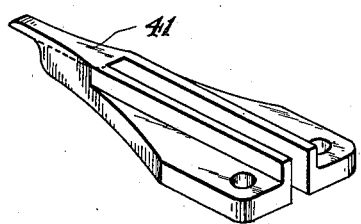
Fig. 11
Inventor
Thomas A. Bowers
by Munroe T. Hamilton
attorney Dec. 21, 1937.   T. A. BOWERS   2,103,142
COMPACTING APPARATUS
Filed Jan. 4, 1936   7 Sheets-Sheet 5
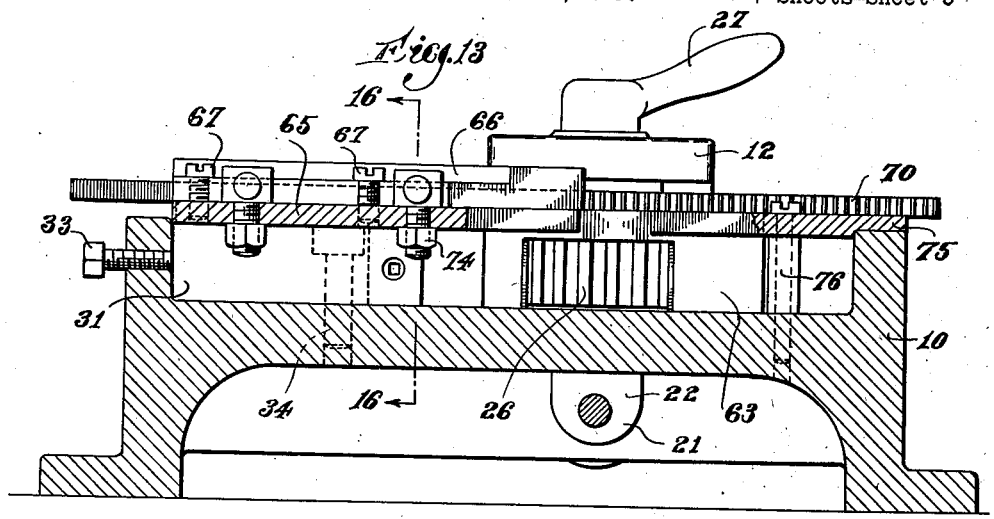
Fig. 13
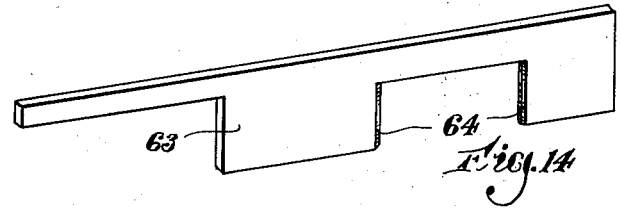
Fig. 14
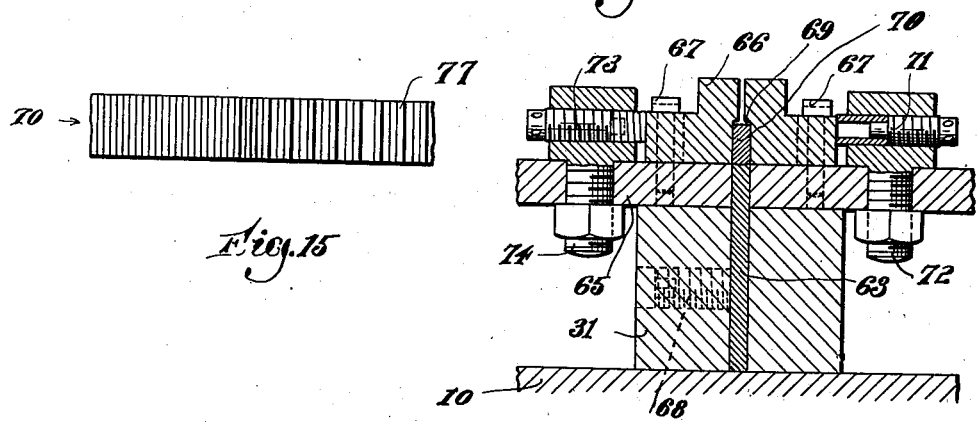
Fig. 15
Fig. 16
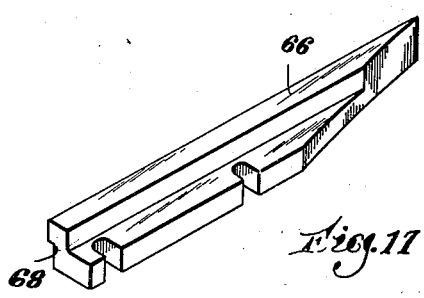
Fig. 17
Inventor
Thomas A. Bowers
by Munroe H. Hamilton
Attorney

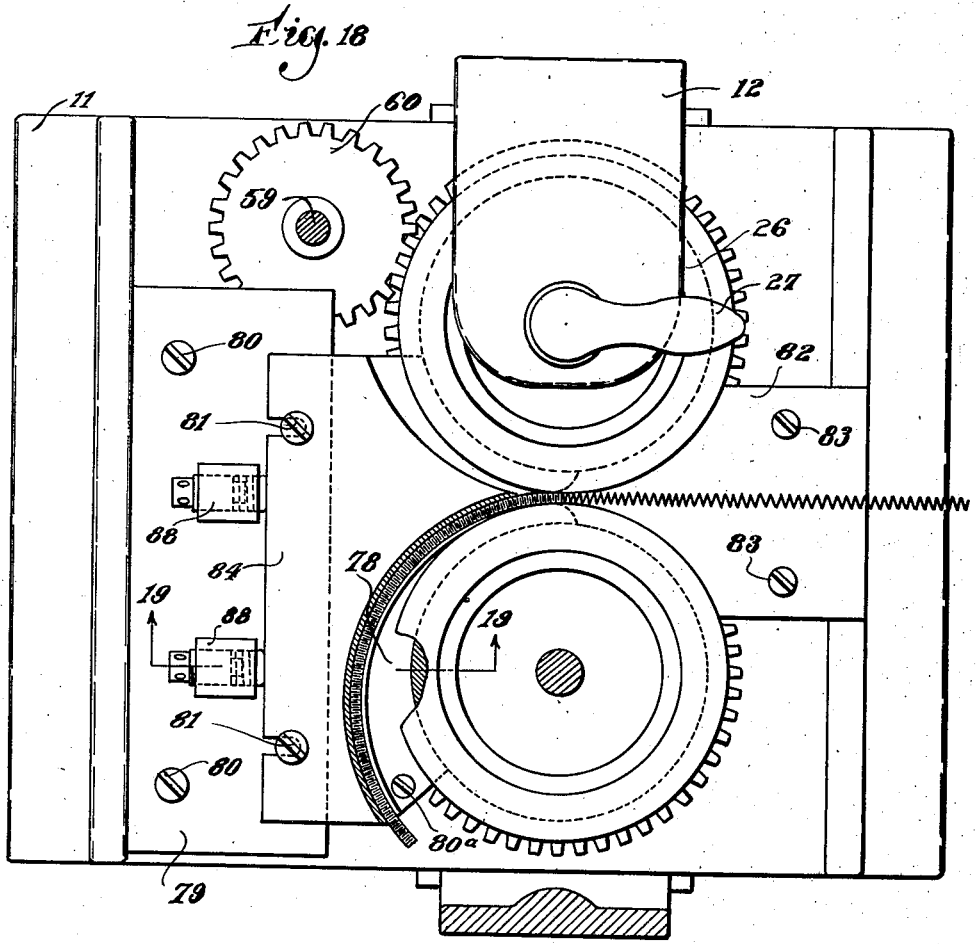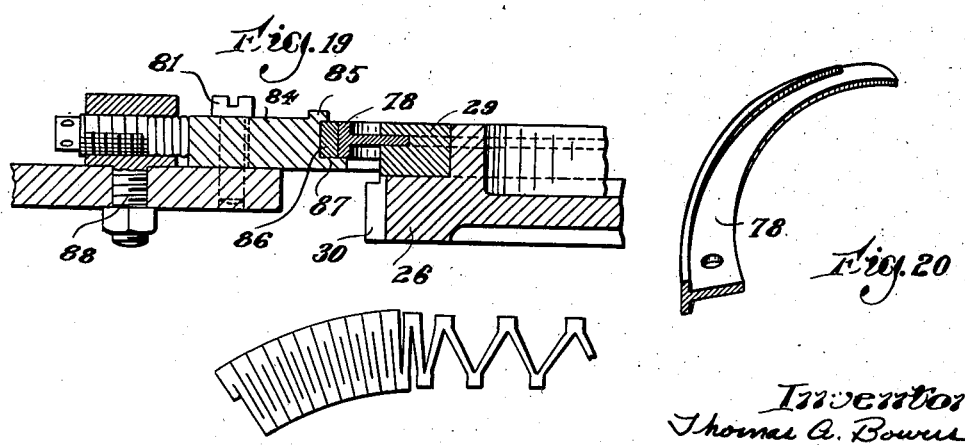

Dec. 21, 1937.  T. A. BOWERS  2,103,142
COMPACTING APPARATUS
Filed Jan. 4, 1936  7 Sheets-Sheet 7
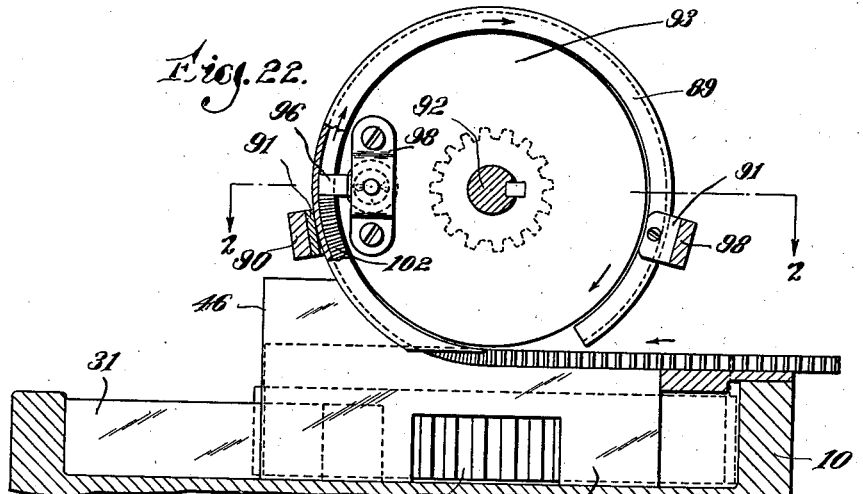
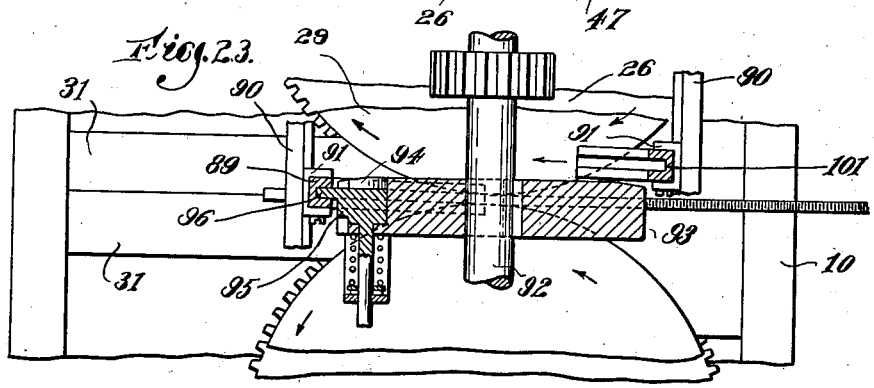
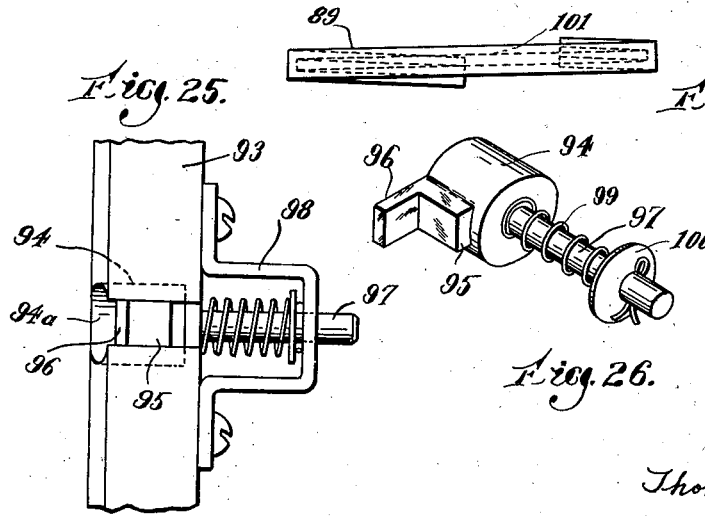

Patented Dec. 21, 1937

2,103,142

UNITED STATES PATENT OFFICE 2,103,142

COMPACTING APPARATUS

Thomas A. Bowers, Boston, Mass.

Application January 4, 1936, Serial No. 57,569

8 Claims. (Cl. 153—32)

My present invention relates to a compacting apparatus and more particularly to an apparatus for compacting a reversely bent material into a substantially solid body.

When a strip or sheet of reversely bent material is compacted there is formed a substantially solid body which may be used for a variety of purposes, one of the more important being its application as packing. If a metal strip is used, the compacted material may form a very satisfactory piston ring.

The present invention is concerned with apparatus for compacting reversely bent material in either a straight state or a curved state and a preferred embodiment will comprise means for compacting material into a substantially circular body for use as a piston ring. The reversely bent material will be referred to throughout the specification as having bends or crowns which comprise the points in the material at which bending occurs. Those portions of material occurring between the points of bending will be referred to as webs. The material may be compacted with the crowns and webs occurring in either a vertical or horizontal plane. There may occur several difficulties in compacting reversely bent material. There is a tendency for the material to compact in a non-uniform manner, as for instance when the compacting occurs in a curved direction the webs may not become disposed in a true radial relation with respect to one another. Also buckling may occur whereby all of the crowns are not disposed in the same plane. Considerable care must be exercised to avoid scoring the metal and there is further a tendency for clogging to take place especially where tooth members are applied to compact the material.

I attain my compacting results by making use of a friction principle and the present device comprises new structure embodying such a principle with certain modified features.

My present apparatus is provided with modifications which are designed to more efficiently compact several classes of reversely bent material. Among these classes are a simple reversely bent material, a reversely bent material with keystone shaped crown portions, and a reversely bent material with right angle keystone shaped crown portions. Each of these classes of material may involve differing compacting operations and each of them may be engaged along the edges and/or crowns and packed in either a straight or curved direction.

A further discussion of these differences in the material will be set forth hereafter.

The principal object of my invention is therefore an improved compacting apparatus for use with reversely bent material.

Another object is a compacting apparatus of the character described which will effect compacting with the elimination of buckling effects and with substantially uniform disposition of the webs.

Another object is an aparatus as described employing friction means for closing which will not score the material and is free from clogging effects.

Still another object is compacting apparatus suitable for use in compacting a given length of material of several different classes.

Other objects and novel features comprising the construction and operation of my invention will appear as the description of the same progresses.

In the drawings illustrating the preferred embodiment of my invention,

Fig. 1 is a plan view of my improved compacting apparatus more particularly illustrating a modification for compacting keystone shaped crown material.

Fig. 2 is a vertical cross section taken on the line 2—2 of Fig. 1.

Fig. 3 is an enlarged view of a length of keystone shaped material; that portion at the right hand side of Fig. 3 being in a compacted state and comprising a plan view as it appears in a finished ring.

Fig. 4 is a cross section taken on the line 4—4 of Fig. 2.

Fig. 5 is a cross section taken on the line 5—5 of Fig. 2.

Fig. 6 is a cross section taken on the line 6—6 of Fig. 2.

Fig. 7 is a view showing in perspective one side of the composite presser foot member.

Fig. 8 is a plan cross section taken on the line 8—8 of Fig. 5 fragmentarily showing a full length of the machine with some of the elements removed from the upper part of the machine.

Fig. 9 is a vertical cross section taken on the line 9—9 of Fig. 6.

Fig. 10 is a view showing in detailed perspective a channel base member.

Fig. 11 is another detailed perspective of a lead guide member.

Fig. 12 is a view showing in elevation a portion of a modified friction wheel such as may be used in my apparatus.

Fig. 13 is a view similar to Fig. 5 but with the difference that a modified presser foot and channel base have been shown more particularly suitable for use in closing straight material.

Fig. 14 is a view showing in detailed perspective the modified channel base illustrated in Fig. 13.

Fig. 15 is a view similar to Fig. 3 and showing a length of straight material somewhat exaggerated.

Fig. 16 is a vertical cross section taken on the line 16—16 of Fig. 13.

Fig. 17 is a view showing in detailed perspective one of the adjustable channel sides illustrated in Fig. 13.

Fig. 18 is a plan view somewhat similar to Fig. 1 but showing a modified apparatus for compacting right angle keystone shaped material.

Fig. 19 is a vertical cross section taken on the line 19—19 of Fig. 18.

Fig. 20 is a view showing in detailed elevation a stripper member as used in the modified apparatus illustrated in Fig. 18.

Fig. 21 is a side elevation of a length of right angle keystone shaped material.

Fig. 22 is an elevational view of another modified compacting mechanism illustrating a rotating disc and dog assembly for compacting a given length of material into a ring.

Fig. 23 is a plan view taken on the line 2—2 of Fig. 22.

Fig. 24 is a plan view showing in detail the annular compacting channel illustrated in Figs. 22 and 23.

Fig. 25 is a greatly enlarged detail view of the rotating disc and dog assembly in end elevation and Fig. 26 is a detailed perspective view of the dog member shown in Figs. 22 to 25 inclusive and more clearly illustrating a cylindrical block and spindle support for said dog.

Referring more in detail to the drawings, Figs. 1–12, inclusive, illustrate a compacting apparatus which is provided with a pair of friction wheels common to all modifications of compacting apparatus herein referred to. Several of the other elements of the machine however, are particularly designed for use in compacting a class of material which I have designated as keystone material. This material comprises the usual reversely bent material which has been further formed with thick crown portions at the bends. These crowns are formed in a keystone or wedge shaped manner such that they comprise a solid segment of material having one side longer than the opposite side as illustrated in Fig. 3. A more detailed discussion of this material is set forth in copending applications, Serial No. 54,152 filed December 12, 1935, No. 54,153 filed December 12, 1935, No. 36,812 filed August 19, 1935, and No. 39,594 filed September 7, 1935, and No. 733,472 filed July 2, 1934.

Figs. 13–17 inclusive illustrate another modified apparatus for use in compacting a straight material, that is a material in which the bends are formed with rectangular crowns similar to those illustrated in Fig. 15.

Figs. 18–21 inclusive, illustrate another modified compacting apparatus which is designed for use in closing a different class of reversely bent material which I have designated as right angle keystone material. This material is also formed by reversely bending a ribbon or sheet of material but is then considered as it appears turned at right angles.

With the keystone material, it should be noted that the bends are considered as tops and bottoms which are formed with thickened portions of a keystone shape to comprise top and bottom land surfaces of a piston ring. The edges of a metal ribbon become folded and compacted together and comprise inner and outer surfaces adapted to engage against the piston groove and the cylinder wall respectively.

With the right angle keystone material, the bends are turned at right angles and then become more properly described as inner and outer bends. These bends are also thickened with a rectangular crown formation but in such a manner that all of the inner bends for contacting the piston groove will have one crown size and all of the outer bends for contacting the cylinder wall will have a larger crown size. This results in the right angle construction.

Figs. 22–26, inclusive, illustrate a further compacting apparatus which is designed to compact a predetermined length of material such as that length which might comprise a given size piston ring. This type of apparatus may be used for circularly compacting any of the classes of material previously cited and described.

Again having reference to the drawings and particularly to the modification illustrated in Figs. 1–12, inclusive, any suitable bed construction may be used as for example that shown in the drawings in which 10 denotes a bed member having lateral supporting base portions 11 adapted to maintain the bed in a raised position. Slidably keyed in the bed 10 are U shaped castings 12, the bottom portions of which have outwardly beveled edges comprising slides 13 which may engage in ways 14 of the bed 10. Centrally and vertically disposed through the inner extremities of the castings 12 are rods 15 having their lower extremities collared at 16 and shouldered at 17 to comprise annular internally threaded bosses 18 as better shown in Fig. 2. The bed 10 may be recessed at 19 to provide for receiving the collared portions 16 of rods 15 in a laterally adjustable manner and may be further constructed with downwardly extending flange portions 20 through which have been horizontally mounted threaded bolt members 21, the bolt members 21 in turn engaging through the threaded bosses 18 and having their inner extremities secured by a turnbuckle construction in further depending trunnions 22 of bed 10.

Solidly mounted about the rods 15 and adjacent the U members 12 are bearing members 24 and spacing blocks 23. Journaled about the rods and provided with bushings 25 are a pair of wheels generally indicated by the numeral 26. The upper ends of the rods 15 have been threaded as indicated at 27 in Fig. 4 and engaged therearound are levers 27a.

It will be seen that two adjustments of the rod and wheel assembly in the bed 10 may be had. The lever 27 is adapted to tightly compress the castings 12, rod 15, spacing block 23 and bearing 24 against the bed 10, and when such tension is released the position of the whole rod may be laterally adjusted by advancing the boss 18 along the threaded bolt 21, and the collared portion 16 of the rod 15 moves along the recess 19 of the bed 10.

The present wheel assembly and adjustable supporting means are intended to be illustrative of various methods of providing a wheel assembly. The wheels 26 herein shown comprise a combined drive mechanism and friction members, there having been constructed rim portions 26a shouldered at 28 to receive friction shoes 29 thereon and having gear teeth 30 struck out around their lower portions. It should be understood that various types of friction wheels are intended to be used not necessarily forming a part of the drive mechanism.

In Figs. 5 and 8, I have indicated a guide adjustment block 31 which may be used and has one end located adjacent the lateral upstanding side portion 32 of the bed 10 with a slight clearance being provided therebetween. Adjustment bolts 33 may be threaded through the side portions 32 and be adapted to bear against opposite sides of the adjustment block 31 which may be secured to the bed 10 by means of a countersunk bolt 34. The other end of the adjustment block 31 may be provided with a wedge shaped extremity adapted to extend inwards to a point adjacent the engaged surfaces of the teeth 30 on the wheels 26.

Block 31 may support a pair of guide members 35 which are oppositely disposed thereon and secured by means of bolts 36 passing through adjustment slots 36a better illustrated in Fig. 7. It will be noted that these guide members 35 have annularly beveled extremities which are adapted to coincide with the periphery of the friction wheels 26 so that the extreme tips 37 of guide members 35 may extend inwardly to a point just short of dead center and a true centering adjustment of the two guides may be effected by loosening bolts 34 and 36 and advancing or withdrawing the bolts 33. The adjustment block 31 may be further provided with a vertical slot 37 adapted to receive a bridge member to be discussed later and the two guide members 35 may ordinarily be maintained apart a distance equal to the width of the slot 37.

At the right hand side of the device as viewed in Fig. 8 of the drawings, I have located a lead base 38 which may be of some convenient shape as illustrated and firmly bolted to the bed 10 at 39 and further supported by a sleeve and bolt assembly 40. This lead base 38 is similarly beveled as guide members 38 to be disposed adjacent the wheels 26 at their opposite side and likewise may be provided with a bridge slot 37a. On the lead base 39 may be mounted a lead member 41 which is secured thereto by means of bolts 42 and comprise a channelled member which is tapered at its inner end and terminates adjacent the wheels 26 as is better shown in Fig. 6.

Laterally disposed adjacent the left hand side 32 of bed 10, as viewed in Fig. 1, I have mounted a second spacing block 44 supported by sides 45. Upon the block 44, there has been located a pair of movable channel sides or presser foot members 46 which may be recessed at 47 to provide a slot of the same dimension as slots 37 and 37a previously referred to and they have their inner extremities annularly beveled and extending to a point adjacent the engagement of the wheels 26.

Mounted in the slots 37 and 37a and projecting upwards through the slot 37 is a bridge or channel base member 47 more clearly illustrated in Fig. 10. It will be observed that the bridge member 47 has a supporting edge 48 which is annularly formed and at the lower portion of its curve may be constricted at 49 which is the point at which the wheels engage a reversely folded material 50 when passed therebetween from the lead member 41. Also bridge 47, if used with a combined driving mechanism and friction roll apparatus may be cut out along the beveled edges 51 to provide for meshing of the teeth 30 therethrough. In Fig. 5 it may be seen that the guide block 35 projects inwardly to a point adjacent the channel base portion 48 of bridge 47.

The channel sides 46 may be provided with two adjustments, for example bolts 52 may be threaded through lug portions 53 and be adapted to have their ends advance against the channel sides 46 and adjust them in a desired longitudinal position while adjustable side rails as 54 may be secured above the block 44 at 55. Upon the lead base 38 at 56 may be provided two threaded post members 57 located at one side of said presser foot 46 and two other threaded bolt and compression spring assemblies 58 may be provided at the other side of said presser foot 46 so that any desired lateral adjustment and compression force may be arrived at. Transversely mounted across the side rails 54 is a strap 54a through which have been vertically located headed set screws 55a which are adapted to have their lower extremities screwed against the top of the channel sides or presser feet 46 and maintain same in a fixed position.

Mounted on the under side of the block 44 solidly about a shaft 59 which extends vertically through the said block is a pinion 60 adapted to engage with the inner wheel 26 which may drive same from a source of energy not shown. The pinion has been indicated as one means of providing a drive for the wheels 26 but it should be understood that I contemplate making use of various conventional gear drives in association with rotating friction members.

In the operation of the modification illustrated in Figs. 1–12, inclusive, a length of material 50 is entered in the lead member 41 as shown in Fig. 6. It should be noted that the material is keystone shaped and preformed with segments of material at the bends which I have designated as crowns 61. It is of course possible to compact plain reversely bent material in this same apparatus. The crowns 61 will preferably be disposed in a sidewise and vertical manner in the lead 41 as illustrated in Fig. 6 so that as the material immerges from the lead along the channel base 48, alternate crown surfaces will feed between the shoes 29 and by adjusting the wheels 26 with the adjustment bolts 21 and 27 against the bridge member 47 at the constricted point 49, a desired amount of friction force may be developed at this point with wheels 26 engaging the crowns.

It is pointed out that this friction force carries the crowns along the channel base 48, they being held in place by the guide members 35 and there is built up an adjustable back pressure in the channel members. By properly regulating the friction force of the wheels and this back pressure it is possible to compact the material 50 such that the legs are packed in a substantially uniform position and this is a highly desirable function.

It should also be noted that as one side of the keystone crown is of greater dimension than the opposite side, a plurality of these crowns tend to compact along a curved path and hence the channel may be designed with a curved base. The importance of disposing the legs as true radii becomes apparent from consideration of the fact that when formed in a piston ring they contact the curved cylinder surface and if they are to completely contact the said surface, they must be truly vertical with respect to it. The channel sides also perform a second function of maintaining the material against the channel base so that buckling will not occur thereby insuring that the crowns will lie adjacent one another in a true circular path and with this friction means of compacting there is no opportunity for clogging to occur nor will there be any possibility of the crowns or edges becoming damaged or scored.

In Figs. 13–17 inclusive, I have illustrated a modified compacting structure which may be used for compacting plain reversely bent material or material formed with rectangular crowns. The compacting occurs in a straight line resulting in a straight length of the closed stock.

The base of this modified machine may be substantially the same as that in the modification disclosed in Figs. 1–12 inclusive, comprising a bed 10, an adjustable guide block base 31 secured thereto by a countersunk bolt 34 and a pair of friction wheels 26 adjustably secured in said base in a similar manner as illustrated in Fig. 4.

The guide block base 31, indicated, in Fig. 16, may be grooved to receive a bridge member 63 more clearly shown in Fig. 14 which may similarly be cut out with beveled edges 64 to permit engagement of gear teeth therethrough.

The other end of the bridge 63 is constructed with a long fin portion which rests over the guide block base 31 and extends out to the side of the bed 10. Mounted across the base 31 is plate 65 which is also grooved to receive the bridge 63 and mounted on the guide 65 is a pair of channel sides 66 secured thereto by means of bolts 67. It should be noted that longitudinal movement of the bridge 63 may be controlled by means of a set screw 68 as shown in Fig. 16. The channel sides 66 act similarly as the side members 46 shown in Fig. 5 with the difference that they have been recessed at 68 along their inner sides so that when brought together as shown in Fig. 16, they form a guide shoulder 69 just above a material 70 located therein.

At the right hand side of the channel sides 66, as viewed in Fig. 16, I have mounted adjustment posts 71 which are fastened through the plate 65 by means of bolts and are adapted to locate these sides. At the left of the channel sides, I have similarly disposed bolt and compression spring members 73. These compression members are adapted to regulate the contact of the sides with the material 70.

In Fig. 13, 75 denotes a lead plate member for receiving unclosed material 70 and delivering it to the friction wheels 26 and is supported by a bolt and sleeve assembly 76. In Fig. 5, the material 70 has been shown in exaggerated size illustrating the rectangular crowns 77 in both an open and closed state.

In operation, the material 70 passes over the lead member 75 between the friction shoes of the wheels 26 and then along the bridge 63 between the channel sides 66 with there again occurring a back pressure just beyond the dead center point of the wheels. The closed material then continues along the entire length of the bridge 63 and appears at the left hand side of the drawings as seen in Fig. 13. The same straight packing is effected without buckling, clogging or scoring of the material.

In Figs. 18–21 inclusive, I have illustrated another modified compacting apparatus designed particularly for use in compacting the so-called right angle keystone material. Due to the fact that, as mentioned above, it is preferable although not absolutely necessary, to apply this friction force to the crown portions of the reversely bent material, compacting has been illustrated as occurring in a curved path and in a plane horizontal with respect to the machine. The same reason accounts for the compacting of the keystone material, described above, occurring in a plane vertical to the machine. It will be noted therefore that I may if desired, reverse this procedure, that is to say apply the friction force of the wheels to the edges of the reversely bent material. When this is done of course, right angle keystone stock may be compacted in a vertical plane and in apparatus similar to that illustrated in Figs. 1–12 inclusive and similarly keystone material may be compacted in a horizontal plane and in apparatus similar to that about to be described. This interchangeability would also be true for plain reversely bent material.

Again having reference to the modification in Figs. 18–21 inc., the apparatus may comprise base, casting and wheel construction similar to that previously illustrated and described with the only difference being that one of the friction shoes 29 has been recessed to receive a stripper plate 78 better shown in Figs. 19 and 20 and supported at 89a. A block member 79 has been located along the side of the bed 10 and supported by means of bolt and sleeve units 80 and 81. At the opposite side on the bed 10, I have located a lead plate 82 similar to those previously described and again supported by means of bolt and sleeve assemblies 83 engaging through the bed 10.

Upon the block member 79, I have further adjustably secured a slotted channel plate 84 which may be maintained by means of screws 81 and is constructed with an annular rim 85 and recessed to provide a channelled side 86 and base 87 providing for compacting to take place in a curved manner and in a horizontal plane. Bolted through the plate 79 at 88 are two adjustment members adapted to pivotally center the plate 79 with respect to the wheels 26 as well as advancing the plate inwards.

In Figs. 22–26 inclusive, I have illustrated a still further modification of compacting apparatus which may be used for any type of reversely bent material and which differs from those modifications previously discussed in that the material as passed from the friction wheels compacts against a moving resistance of a positive nature.

As in the previous modification, a similar bed and friction wheel assembly may be employed in which may be mounted some suitable bridging means such as for example a bridge or channel base similar to those already illustrated.

In Fig. 22, I have illustrated the upper structure of a compacting apparatus in which appear fragmentarily a bed 10, driving mechanism 26, adjustment blocks 31, bridge 47 and channel sides 46. Adjacent the channel sides 46 and engaged slightly over the bridge 47, at the left hand side thereof as viewed in Fig. 22, I have located an open grooved compacting ring 89 which is formed in an offset manner, with respect to the vertical plane of the ring. I have further provided a pair of supporting arms 90 which are horizontally maintained at their extremities above the machine by means of uprights not shown. The arms 90 are in turn provided with brackets 91 which are adapted to solidly engage with the ring 89 at either side thereof and maintain it in a fixed position.

In a similar manner, I have horizontally disposed a shafting 92 across the machine and above it and again, the supports therefore as well as a gear train associated with some drive as pinion 60, have not been shown. Upon the shaft 92, I have keyed a disc 93 which is adapted to rotate with shaft 92 and have a diameter allowing for location of the disc partly in the ring 89.

At a point on the periphery of the disc 93, I have recessed and secured a spring and dog assembly. Transversely and internally disposed in a slot 94a in the disc 93, at a point adjacent its periphery is a cylindrical block 94 having an outwardly extending shoulder portion 95, the outer surface of which coincides with and forms a part of the periphery of the disc 93. A further extending dog portion 96 projects beyond the said periphery.

Block 94 is further provided with a transversely disposed spindle 97 which has its outer end mounted through a U support member 98 solidly secured to the face of the disc 93. About the spindle 97, there has been disposed a coiled spring member 99 and a washer 100 is firmly pinned to the spindle 97 in such a manner that the action of the spring 99 tends to compressibly maintain the whole dog assembly against the right hand side of disc 93 as viewed in Fig. 25.

In operation the disc 93 is located in the ring 89 as shown with the dog portion 96 engaged in the groove 101 of ring 89. The disc is then rotated to take a position whereby the dog 96 will be located at the extreme left hand extremity of ring 89 as viewed in Fig. 22, and the machine is then ready to receive material.

A material 102, indicated at the right hand side of Fig. 22, is entered between the friction rolls and then passed into the groove 101 of ring 89 being compacted thereby against the dog 96 which starts to travel around the ring in the groove. As the material passes around the ring groove, it is slightly offset in accordance with the formation of the ring and the dog 96 is pressed inward against spring 99. When the dog reaches the offset extremity of the ring 89, it springs back into the original alignment and re-enters the groove 101 in readiness for another compacting operation. The resistance of the rotating dog may be varied by some suitable means such as the gearing which has been illustrated. With the present type of apparatus any class of material may be compacted and usually a given length will be cut off at some point during passage of the material through the friction members.

It should be understood that I have in mind the application of various modifications in compacting apparatus utilizing a friction closing principle for compacting material of varying proportions and bend formations.

Having thus described my invention, what I claim is:

1. An apparatus for compacting a reversely bent material comprising a pair of friction wheels adapted to engage said material, a curved slideway for receiving the engaged material in a retarded manner and means for actuating said friction members, said slide way being curved in a vertical plane and adapted to compact the upper bends of the material faster than the lower bends.

2. In an apparatus for compacting a reversely bent material into a substantially solid body, a pair of diametrically opposed wheels adapted to engage the said material therebetween, a track for supporting and guiding said material vertically disposed below said wheels, a curved slideway for receiving said engaged material and means for rotating said wheels, said slide way being curved in a horizontal plane whereby one edge of the material is compacted substantially more tightly than the opposite edge.

3. An apparatus to compact a reversely bent metal ribbon comprising rotary friction members, said friction members being spaced apart and adapted to engage said material therebetween, a channelled lead member for entering said material between said friction members, a bridge member located between said friction members and having one end adjacent said lead member, and adjustable channel sides located adjacent the sides of the other end of the said bridge member.

4. A machine to close a reversely bent metal ribbon comprising a base, a pair of friction wheels rotatably mounted in said base, a centering block mounted on said base and provided with a wedge shaped extremity located adjacent the point of engagement of said wheels with material passing therebetween adjustable channel sides disposed on said block adapted to provide a resistance against the passage of the said material from the wheels and means for driving the said wheels.

5. A machine for closing a reversely bent metal ribbon into a substantially solid circular body comprising a base, spaced apart friction surfaces located thereon in a horizontal manner, a curved horizontally disposed stripper plate slidably recessed in one of the said friction surfaces, an annular channel base and side located adjacent said stripper plate and supported by holding means on said base.

6. An apparatus for compacting a reversely bent material into a substantially solid circular body comprising rotatable friction members adapted to engage and pass the said material therebetween, a compacting ring located adjacent one side of said friction members and adapted to receive the said material as it passes from said friction members and compact it into a solid circular body.

7. An apparatus for compacting a reversely bent material into a substantially solid circular body comprising rotatable friction members adapted to receive and deliver the material with a positive force, a compacting ring located adjacent one side of said friction members adapted to slidably receive said material in a retarded manner, said ring being provided with a grooved inner periphery, a disc rotatably disposed in said ring and provided with an adjustable dog portion adapted to engage in said groove and provide a moving resistance to material passing around said groove.

8. A machine to close a reversely bent metal ribbon comprising a bed, a pair of vertical shaft members located therethrough, ways recessed in said bed and U shaped castings having lower slide portions located in said ways, a pair of friction wheels journaled about said shaft and located within said castings, a spacing block solidly located between said wheel and said casting, a guide block secured between one side of said bed and said wheels, a channel base member recessed therein in a vertical manner and extending between said friction wheels and further provided with a constricted central portion, channel sides located on said guide block and adjacent said bridge member.

THOMAS A. BOWERS.